United States Patent [19]
Baermann

[11] 3,889,140
[45] June 10, 1975

[54] INDUCTION BRAKE OR CLUTCH

[75] Inventor: Max Baermann, Cologne, Germany

[73] Assignee: Firma Max Baermann, Cologne, Germany

[22] Filed: June 8, 1973

[21] Appl. No.: 368,279

Related U.S. Application Data

[63] Continuation-in-part of Ser. No. 153,785, June 16, 1971, abandoned, which is a continuation of Ser. No. 853,764, Aug. 28, 1969, abandoned.

[30] Foreign Application Priority Data

Aug. 31, 1968  Germany............................ 1763894

[52] U.S. Cl. ................. 310/103; 310/165; 310/191
[51] Int. Cl. ........................................... H02k 49/04
[58] Field of Search ........................... 310/93–107, 310/165, 268, 191, 156, 209

[56] References Cited
UNITED STATES PATENTS

| | | | |
|---|---|---|---|
| 547,069 | 10/1895 | Gorges............................ | 310/268 X |
| 2,573,283 | 10/1951 | Seitz................................ | 310/268 X |
| 3,151,261 | 9/1964 | Lee.................................. | 310/165 X |

*Primary Examiner*—Donovan F. Duggan
*Attorney, Agent, or Firm*—Meyer, Tilberry & Body

[57] ABSTRACT

An induction brake or clutch capable of producing high torques over prolonged periods without excessive heating. The braking currents are generated in low resistance windings and dissipated in external higher resistance members so that the heat does not detrimentally effect the device. Permanent magnets are employed to generate flux and reduce the heat normally generated internally by exciting currents. Poles on a stationary member are arranged in two axially adjacent rings which are relatively circumferentially movable at least one pole pitch so that the torque may be readily adjusted. In a preferred embodiment the rotating member has permanent and electromagnet exciting field poles for the low resistance windings and other windings excited by stationary permanent magnets connected to the electromagnets through a rectifier.

18 Claims, 11 Drawing Figures

INVENTOR.
MAX BAERMANN

BY

Meyer, Tilberry & Body
ATTORNEYS

INVENTOR.
MAX BAERMANN

BY

Meyer, Tilberry & Body
ATTORNEYS

PATENTED JUN 10 1975 3,889,140
SHEET 3

INVENTOR.
MAX BAERMANN
BY
Meyer, Tilberry & Body
ATTORNEYS

FIG. 11.

INDUCTION BRAKE OR CLUTCH

This application is a continuation-in-part of my copending U.S. patent application Ser. No. 153,785 filed June 16, 1971, now abandoned which in turn is a continuation of my U.S. patent application Ser. No. 853,764 filed Aug. 28, 1969, and now abandoned.

This invention pertains to the brake or clutch art, and more particularly to an improved induction brake or clutch.

The invention is particularly applicable to induction brakes or clutches for wheeled vehicles and will be described with particular reference thereto; however, it is to be appreciated that the invention has broader applications, such as for gear driven apparatus, such as elevators, cranes and the like.

Induction brakes or clutches, which are used for braking and/or coupling rotating parts, have heretofore comprised first and second members mounted for relative rotation in close spaced relationship. One of the members included a conductive member or members and the other member included means for causing an alternating flux field in the conductive member when the members rotated relative to each other. The means for generating the flux field were either electro or permanent magnets so arranged on the second member that alternating polarity results. When one member rotated relative to the other, the flux induced high currents in the conductive member. These currents generated a countermagnetic field which produced a braking torque, the intensity of which depended upon the amount of flux and rate of rotation. The currents in turn produced a substantial amount of heat in the conductive member which of course had to be continuously dissipated.

One of the principal problems with a brake or clutch of the type described has been the inability to properly dissipate this heat during the braking operation.

Another problem where the flux is generated by electromagnets has been the heat generated internally of the device by the exciting currents has been substantial and caused undue heating if braking or clutching took place for long periods of time.

Another problem with induction brakes or clutches of the type heretofore described, is that they have been too heavy for the amount of torque produced. In rail bound vehicles, it is already common practice to use the driving motors as generators to feed braking resistances when braking is desired. Essentially, however, such motors were designed for driving at high efficiency and rapid acceleration, and are inefficient when used as a generator for braking the vehicle. Thus, in order to accomplish this additional purpose, the construction of the motor is quite heavy; for example, the average weight to power ratio is approximately 5 kilograms per kilowatt of output. Such a weight/power ratio is not acceptable when applied to brakes for use in other types of vehicles, such as automobiles or trucks.

A further problem, particularly when permanent magnets are employed to generate the flux is in controlling the amount of currents generated to thus control the amount of braking action.

The present invention contemplates a new and improved apparatus which overcomes all of the above-referred problems and others and provides an improved induction brake or clutch which has large power handling capabilities for a given size and weight and wherein the torque can be readily controlled.

In accordance with the present invention, there is provided an induction brake or clutch comprised of a first member having a plurality of poles with low resistance windings thereon connected to an external heat dissipating resistance, and a second member having a plurality of field poles and means for generating a flux field of alternating polarity therein. In one embodiment these resistances are in the form of vanes cooled by rotation of the device.

In another embodiment, the poles on one of the members are arranged on at least two axially adjacent rings, relatively circumferentially movable through at least one pole pitch whereby the amount of flux in the air gap or the output voltage of the windings can be controlled.

In another embodiment the flux generating means on the second member includes a plurality of pole pieces and a permanent magnet disposed therebetween with the magnetic polarity of the magnets on each side of each pole piece being the same whereby the flux of adjacent magnets is additive in the pole piece.

In another embodiment the flux generating means on the second member includes a plurality of pole pieces arranged in a ring with a permanent magnet and an electromagnet alternating between every other pole piece, the polarity of adjacent magnets being opposite whereby: when the electromagnets are not energized the flux of the permanent magnets is in a closed loop and the flux on the ends of the pole pieces is substantially zero; and when energized to provide the same polarity the flux of the electro and permanent magnets are additive at the ends of the pole pieces.

Further in accordance with the invention, the second member rotates and the flux on the poles thereof is generated by electromagnets either solely or in conjunction with permanent magnets, the windings of which are energized through a rectifier from other windings on the member. These other windings are associated with other poles on the second member moving relatively to an alternating flux field generated usually by permanent magnets mounted on a fixed third member.

In perferred embodiments the first and third members are stationary and the second member rotates. The torque can then be adjusted by shifting poles on the first or third member by simple mechanical linkages. No sliding electrical contacts or sliding mechanical linkages are required.

The principal object of the present invention is to provide an improved induction brake or clutch which is of relatively small construction for a given power handling capability and is capable of operation in a wide variety of vehicles or other devices.

A further object of the present invention is to provide an improved induction brake or clutch which has a low weight to power ratio.

A still further object of the present invention is to provide an improved induction brake or clutch which is simple and economical to manufacture.

Another object of the invention is an improved brake or clutch, wherein the torque is readily adjusted.

Another object is an improved brake or clutch wherein the internally generated heat is a minimum.

These and other objects and advantages will become apparent from the following description used to illustrate the preferred embodiments of the invention when read in connection with the accompanying drawings in which:

Referring now to the drawings wherein the showings are for the purpose of illustrating the preferred embodiments of the invention only and not for the purpose of limiting same.

Figures 1, 2, 3, 4:
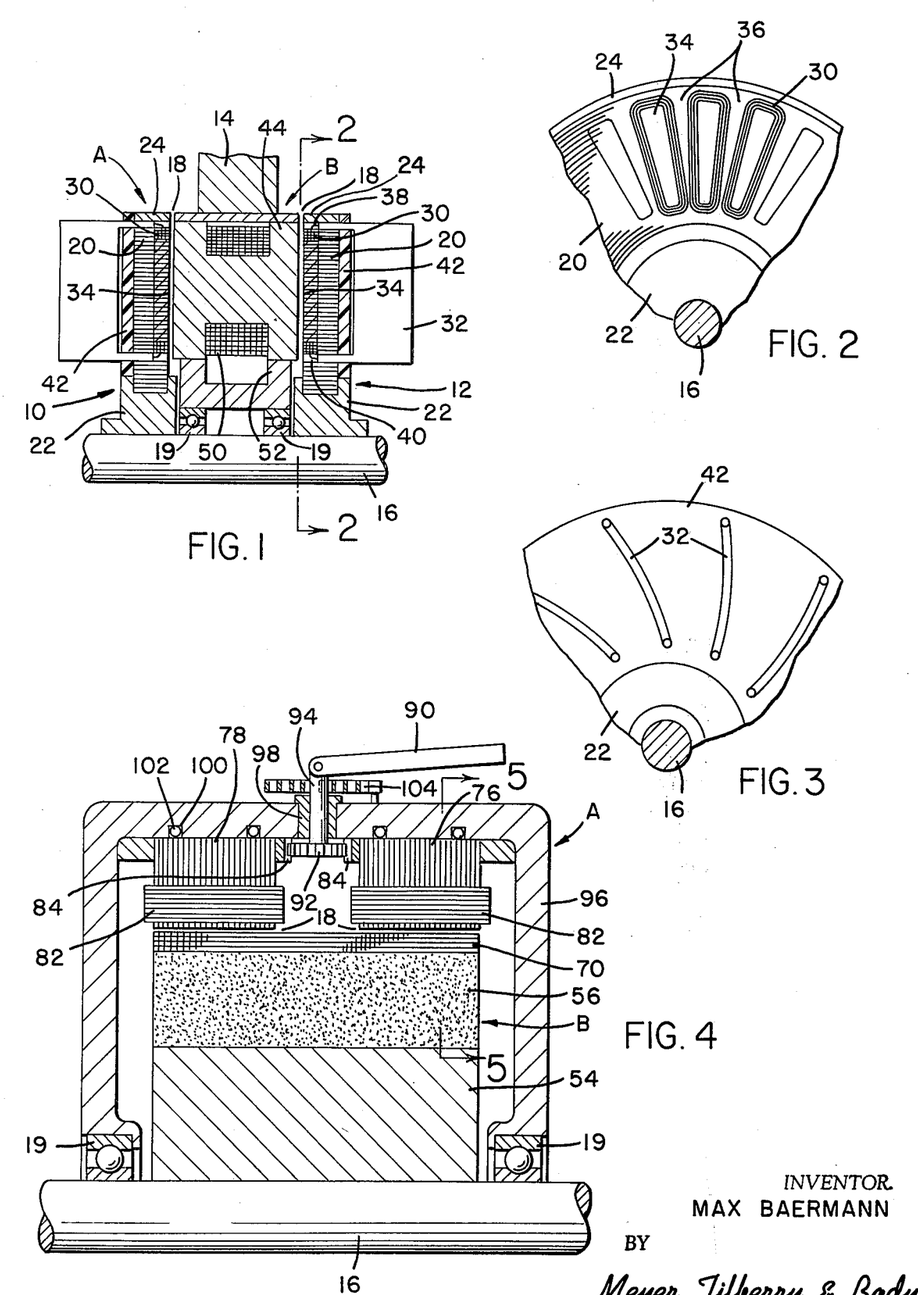
FIG. 1 is a partial cross-sectional view of an induction brake or clutch constructed in accordance with the present invention wherein the first member rotates and the second member is fixed.
FIG. 2 is a cross-sectional view taken along line 2—2 of FIG. 1, showing the low resistance first portions of the closed conductor loops.
FIG. 3 is a partial end view of the induction brake or clutch of FIG. 1, showing the high resistance second portions of the closed conductor loops designed as blade-like members.
FIG. 4 is a partial cross-sectional view of another embodiment of an induction brake or clutch according to the present invention, wherein the second member rotates and the first member is stationary.

FIGS. 1-3 illustrate one embodiment of an improved induction brake or clutch constructed in accordance with the present invention, wherein there is provided a first member, shown as an induction body and designated generally by the reference letter A, and a second member, shown as an inductor body and designated generally by the reference letter B. The inductor body B is secured to a support member 14, such as the vehicle frame, and remains fixed during the operation of the brake or clutch. The induction body A is comprised of two substantially equal induction body segments, designated generally by the reference numerals 10, 12, respectively. The induction body segments 10, 12 are secured to a shaft 16 which is to be braked and are in spaced apart relationship with the inductor body B to define an air gap 18 therebetween. Relative rotation exists between the induction body A and the inductor body B, inasmuch as the inductor body is fixed and the induction body segments 10, 12 rotate adjacent thereto. In addition to being secured to the support member 14, the inductor body B is also supported on the shaft 16 by bearings 19.

The induction body segments 10, 12 are preferably constructed from a plurality of laminated discs 20 which are retained in a carrier 22. The laminated discs 20 are preferably comprised of ferromagnetic strips having poor electrical conductivity which are coiled to form the disc-shaped induction body segments 10, 12. In order to counteract the effect of centrifugal force during rotation, the laminated discs 20 are mounted within a frame member 24. In accordance with the present invention, the induction body A includes a plurality of closed conductor loops having first and second portions which may take a variety of forms; however, in the embodiment illustrated in FIGS. 1-3 the first portions are shown as coil windings 30 and the second portions are shown as blade-like members 32. The closed conductor loops define a resistive element, preferably having a fixed resistance. The surface of the laminated discs 20 which faces the inductor body B, designated by the reference numeral 34, includes a recessed area 36, as shown in FIG. 2. The coil windings 30 are disposed in the recessed areas 36, which are preferably of dovetail-shaped cross section in order to facilitate the retention of the coil windings. Each of the coil windings 30 has a beginning 38 and an end 40, which are connected to the blade-like members 32.

The coil windings 30 are preferably of copper, and as such have a relatively low electrical resistance so that a minimum of heat will be generated therein. On the other hand, the blade-like members 32, which are located in an air stream generally adjacent the induction body segments 10, 12 are of relatively high electrical resistance, whereby the heat resulting from the conversion of energy during the braking operation is generally produced in the blade-like members. A variety of materials, such as chromium-nickel alloy, could be used to construct the blade-like members 32 in order to assure that they are of relatively high resistance. In this manner, the generation of heat is effectuated outside the induction body segments where it can be readily and rapidly dissipated. As such, the resultant heat cannot have a detrimental effect on the induction brake or clutch, as for example, by changing the width of the air gap 18 or heating the windings 30 and bearings 19. As best shown in FIG. 3, the blade-like members 32 are preferably configured to define fan blades, whereby when the induction body segments 10, 12 rotate the blade-like members act as a fan to force air thereacross and effectively dissipate the heat generated therein. To further assure that the heat created in the blade-like members 32 will not have a harmful effect on the other components, insulation 42 is provided intermediate the laminated discs 20 and blade-like members.

The inductor body B includes means for causing a varying flux field in the coil windings 30 which may take many forms; however, in accordance with the embodiment illustrated in FIGS. 1-3 it takes the form of a plurality of ferromagnetic members 44 to each having an exciting winding 50. The ferromagnetic members 44 are carried by a bracket 52 which is disposed intermediate the ferromagnetic member and the bearings 19. The exciting windings 50 are each wound in such a direction that alternating polarity magnetic poles are produced. In this embodiment the braking torque is easily adjusted by regulating the magnitude of the exciting field produced the exciting winding 50.

Reference is now made to FIGS. 4-8, wherein another embodiment of the induction brake or clutch according to the present invention is illustrated. In this embodiment the induction body A has been secured to a stationary component of the vehicle, such as the vehicle frame (not illustrated), and is supported on the shaft 16 to be braked by bearings 19. The inductor body B has been secured to the shaft 16 and rotates relative to the induction body A.

Figure 5:
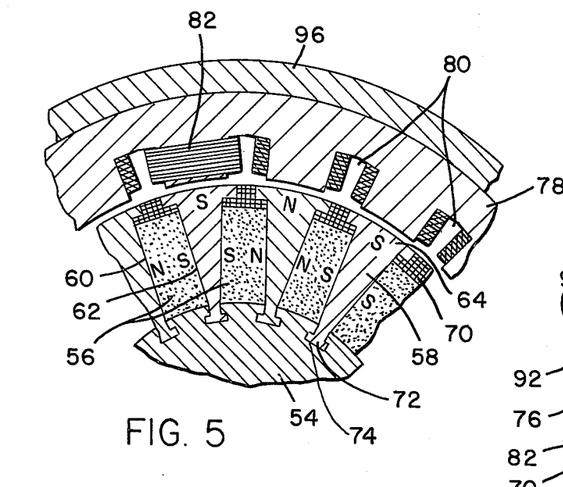
FIG. 5 is a cross-sectional view taken along line 5—5 of FIG. 4.

The inductor B includes means for causing a varying flux field which may take a variety of forms; however, in accordance with this embodiment it takes the form of a permanent magnet system which produces the exciting field. As best shown in FIG. 5, the permanent magnet system includes a magnetically non-conductive, central carrier hub 54 which is secured to the shaft 16. Mounted on the carrier hub 54 is a plurality of circumferentially spaced, wafer-shaped, permanent magnets 56 having ferromagnetic pole shoes 58 disposed intermediate thereto. The permanent magnets 56 are magnetized in the direction of their thin dimension and each has a north pole surface 60 and a south pole surface 62. The permanent magnets 56 are positioned with respect to any pole shoe 58 such that, like pole surfaces abut the intermediate pole shoe. The poles of the permanent magnets 56 have been marked in the drawings by the reference letters N and S. In this manner, poles of alternating polarity are produced in the pole shoes 58, as indicated by the letter N and S, whereby continually alternating polarity is created in the pole shoes at the circumference of the inductor body B. Optimum exciting field conditions are achieved if the pole pitch, as measured about the circumference of the inductor B, is equal to or less than 40 millimeters.

The outer ends of the pole shoes 58, hereinafter referred to as pole heads 64 have been provided with a short circuit winding 70 which serves to counteract the detrimental effects of armature reaction on the permanent magnet circuit. The inner ends of the pole shoes 58 are used to attach the permanent magnet system to the central carrier hub 54 and are configured to define a T-shaped cross section 72 which is releasably retained in a correspondingly configured slot 74 in the carrier hub. It is to be appreciated that although a T-shaped cross section has been shown, a variety of means could be employed for securing the pole shoes, 58 to the carrier hub 54. The magnetic flux produced by the permanent magnet system can be adjusted in a variety of ways, such as by alteration of the air gap 18, diversion of the magnetic flux, or use of short circuit pieces (not illustrated).

The induction body A includes two relatively movable pole rings 76, 78 in spaced apart relationship. The pole rings 76, 78 are preferably constructed from silicon steel sheets and have a plurality of grooves 80, in which the first portions of the closed conductor loops in the form of a coil windings 82, have been inserted. The number of coils 82 provided on the induction body A correspond exactly to the number of poles provided on the circumference of the inductor body B.

In order to adjust the braking torque from a minimum to a maximum, there is provided means for circumferentially displacing the pole rings 76, 78 relative to each other. The pole ring displacing means may take a variety of forms, however, in this embodiment it is shown as comprising a pair of toothed racks 84, each of which is secured to a respective pole rings 76, 78 on the side surface thereof which faces the other pole ring, and an operating handle 90 having a toothed wheel 92 in driving engagement with the racks. The operating handle 90 is connected to the toothed wheel 92 by means of a shaft 94 which passes through a casing 96. Disposed intermediate the shaft 94 and casing 96 is a bushing 98 which facilitates the rotation of the operating handle 90. The casing 96 includes a plurality of axially spaced, circumferential grooves 100 having disposed therein a plurality of balls 102 on which the pole rings 76, 78 roll when the operating handle 90 is displaced. An emergency return spring 104, having one end secured to the casing 96 and the other end secured to the shaft 94, serves as a safety device to turn the operating handle 90 to a preselected position in the event the actuating pedal (not illustrated) in the cab of the vehicle becomes inoperative.

Figure 6:
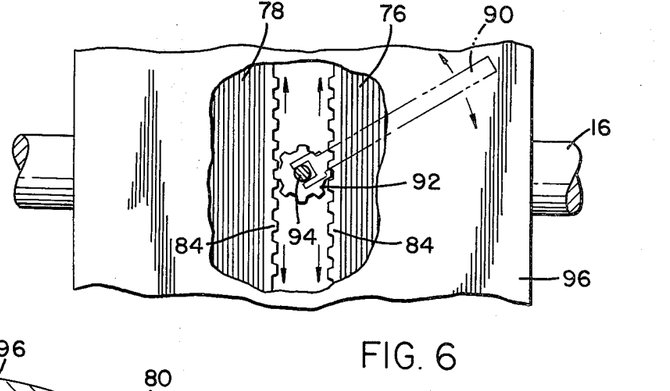
FIG. 6 is a partial plan view, partially broken away, of the induction brake or clutch of FIG. 4.

When the operating handle 90 is rotated, the pole rings 76, 78 are moved in opposite directions, as indicated by the arrows shown in FIG. 6. By use of appropriate stops (not illustrated), the relative movement of the pole rings 76, 78 is limited to one pole pitch; the induction body A and the inductor body B having the same pole pitch separation. In one stop position, the coils 82, which are wound in the same direction, will face pole heads 64 of identical polarity on the inductor body B. In the other stop position, which is exactly one pole pitch removed, the windings 82 will face pole heads 64 of opposite polarity. In the first stop position, the induced currents are cumulative, while in the other stop position, the current induced in one pole ring 76, with respect to the current induced in the other pole ring 78, is out of phase by 180°. When this occurs, the two opposite currents cancel each other out and the resultant braking torque is zero. This mode of adjustment is most advantageous because it eliminates the need for contacts and provides an adjustment means which is accurate and requires little effort to operate. In order to achieve the highest braking power and yet still be able to construct a lightweight and compact induction brake or clutch, it is desirable to use the greatest possible number of pairs of poles.

Figure 7:
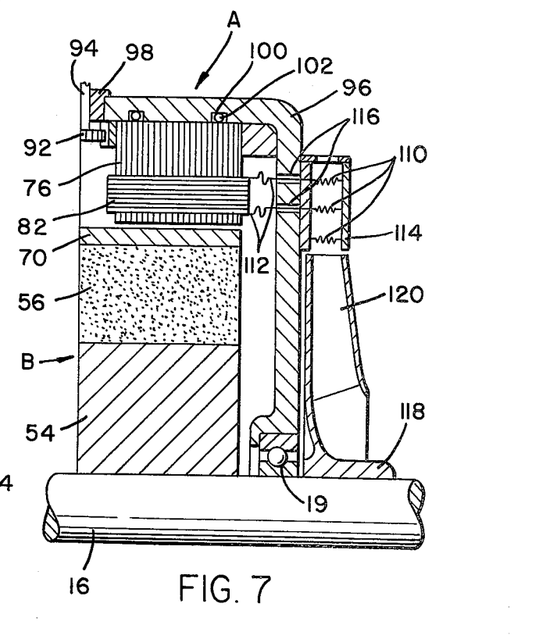
FIG. 7 is a partial cross-sectional view of the induction brake or clutch of FIG. 4, showing in detail the fan blades, air conducting channel and conductors of high resistance.
Figure 8:
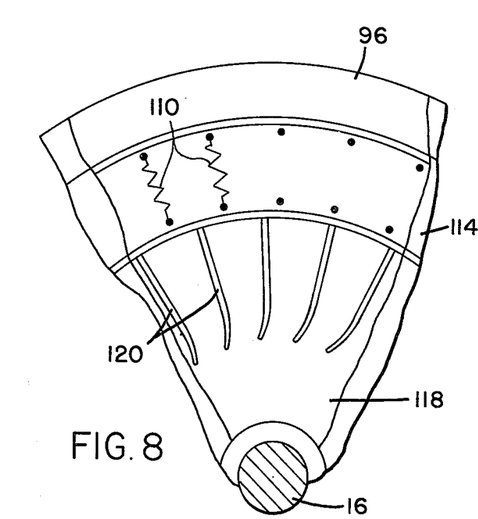
FIG. 8 is a partial end view of the induction brake or clutch of FIG. 7.

The coil windings 82 are of relatively low electrical resistance and the resultant braking torque is generally produced therein. As shown in FIGS. 7 and 8, the coil windings 82 are connected by leads 112 to the second portion of the closed conductor loops, illustrated as conductors of high resistance 110. The coil windings 82 are connected in series to either a single or a group of high resistance conductors 110, whereby in the switched-off position the two opposite currents will cancel each other. The high resistance conductors 110 are located in an air stream outside of and adjacent the casing 96, and are disposed in an air conducting channel 114 which is secured to the casing and made of heat resistant material. The leads 112 which conduct the sum or difference of the currents are flexibly guided out of the induction body A through openings 116 in the casing 96, and, as schematically shown in FIG. 7, connected to the high resistance conductors 110, where the heat resulting from the conversion of energy during the braking operation is generally produced. Secured to the shaft 16 to be braked is a housing 118 having fan blades 120 disposed thereon. When the shaft 16 rotates the fan blades 120 also rotate, thereby directing air into the air conducting channel 114. In this manner, the heat developed in the high resistance conductors 110 during the braking operation is rapidly and effectively dissipated.

It is to be appreciated that the energy produced by the brake can be stored for example by connecting the output to batteries through rectifiers. This stored electrical energy in the battery can then be used to drive motors, which, when the vehicle is started, can be employed to augment the drive, thereby increasing the acceleration of the vehicle.

Figure 9:
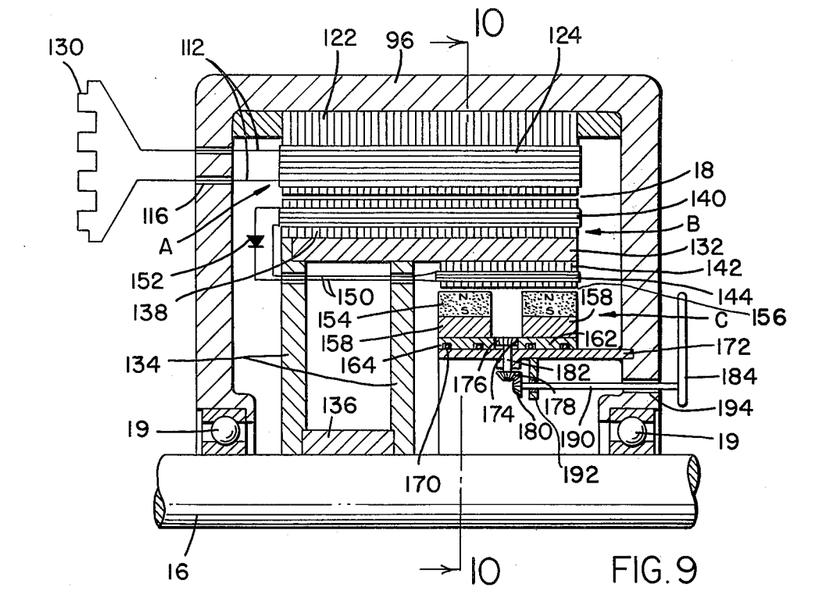
FIG. 9 is another embodiment of an induction brake or clutch constructed in accordance with the present invention wherein the first member is stationary and the second member rotates relative thereto, the second member being electromagnetically excited by an exciting dynamo disposed within said member.
Figure 10:
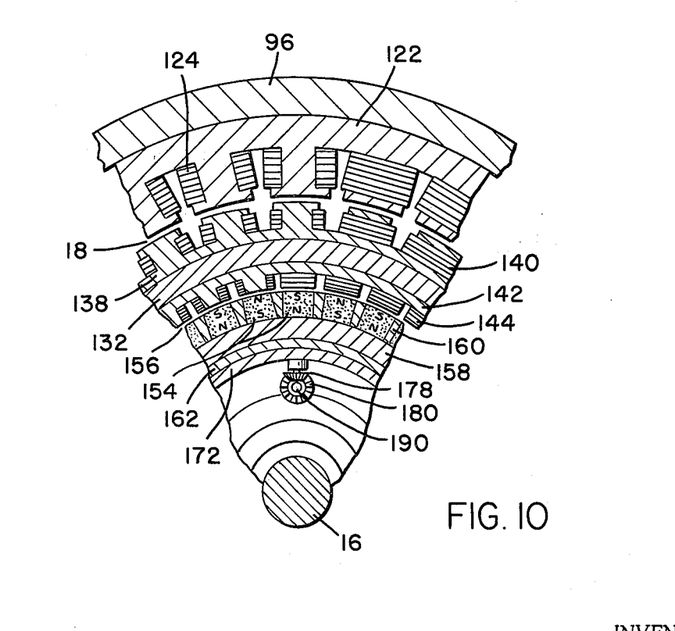
FIG. 10 is a cross-sectional view taken along line 10—10 of FIG. 9.

Reference is now made to FIGS. 9 and 10, wherein another embodiment of the present invention is shown. In this embodiment the stationary casing 96 is supported on the shaft 16 which is to be braked by means of bearings 19. The induction body A has been arranged inside the casing 96, and is comprised of a pole ring 122 made of laminated sheets, and having a plurality of poles each carrying coil winding 124. Each coil winding through openings 116 leads 112 extending through openings 116 and connected to a resistance 130. The inductor body B, which is separated from the induction body A by an air gap 18, is fastened to the shaft 16 which is to be braked and rotates therewith. The inductor body B includes a pole wheel mounting cylinder 132, which is maintained in a concentric position relative to the shaft 16 by support members 134 that may take a variety of forms, such as spokes or discs. The support members 134 are maintained in spaced apart relationship by a spacer tube 136. A pole wheel 138 made of laminated sheets carries an exciting winding 140 and is secured to the exterior circumference of the mounting cylinder 132.

In order to excite the exciting winding 140 of the inductor body B, there is provided an exciting dynamo C which is disposed within the inductor body. The exciting dynamo includes a rotor comprised of laminated, ring-shaped pole sheets 142 which are fastened to the interior circumference of the mounting cylinder 132 and have pole pieces on each of which an induction winding is mounted. The induction windings 144 are connected to the exciting windings 140 of the inductor body B by leads 150 through rectifier 152. With this arrangement, the induction windings 144 rotate together with the exciting windings 140 of the inductor body B and thus require no sliprings or brushes.

The flux field of the dynamo C is generated by a plurality of permanent magnets 154 mounted on two pole rings 158 and spaced from the induction windings 144 by an air gap 156. The flux field is adjusted in a similar fashion to that of the braking movement illustrated in the embodiment of FIG. 4. Secured to the circumference of the pole rings 158 is a retainer 160 made of diamagnetic material in which is embedded the permanent magnets 154. Secured to the bottom of each pole ring 158 is a base plate 162 having slots 164 therein and in which has been disposed bearings 170. The base plates 162 are movably supported on a carrier cylinder 172 which is secured to the casing 96. The interior edges of the base plates 162 have been provided with teeth 174 and a toothed wheel 176 is disposed therebetween and in driving engagement therewith. Bevel wheels 178, 180, which are at right angles to each other, are provided below the carrier cylinder 172; bevel wheel 178 being in driving engagement with the toothed wheel 176 by means of a shaft 182 and bevel wheel 180 being in driving engagement with an operating lever 184 by means of a shaft 190 which is supported by a bearing block 192 and passes through an opening 194 in the casing 96.

In order to switch the exciting current on or off, the two pole rings 158 can be turned relative to each other by up to one pole pitch; the rotor and stator of the exciting dynamo C having the same pole pitch separation (as illustrated in FIG. 10).

It is appreciated that it would be possible to replace the permanent magnet excitation of the exciting dynamo C by electromagnetic excitation. However, these electric currents would generate heat internally of the device which is undesirable.

The type of pole wheel or field generating induction rotor described in my U.S. Pat. No. 3,601,641 issued Aug. 24, 1971, the disclosure of which is incorporated herein by reference in place of pole wheel 138 of FIG. 10, in combination with the other elements hereinabove described, has proven particularly effective in practice resulting in a substantial reduction in the heat generated internally of the device by $I^2R$ losses in the coils 142 while maintaining the necessary flux in air gaps 18 for large torques. Such combination is believed new and unobvious.

Figure 11:
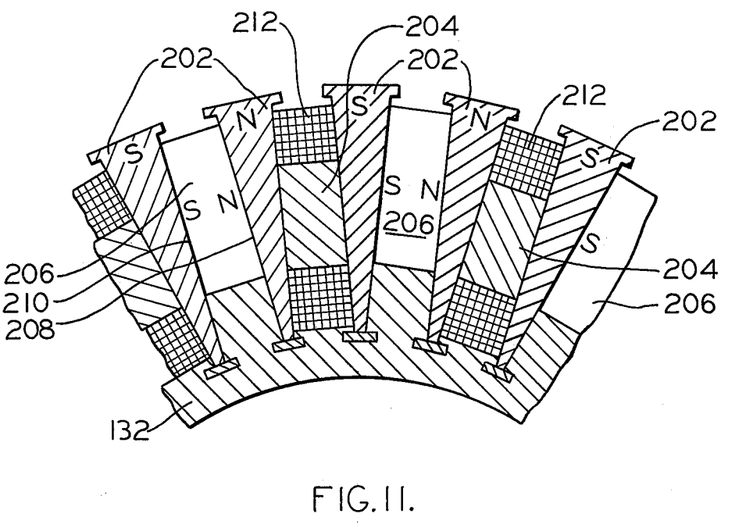
FIG. 11 is a partial cross-sectional elevational view of a field generating induction device used with the induction brake or clutch of FIG. 10.

FIG. 11 shows a plurality of circumferentially spaced pole shoes 202 of alternating polarity indicated by letters N and S. Intermediate ferromagnetic members 204 are positioned between every other pair of pole shoes 202. Permanent magnets 206 are positioned between the remaining pairs of pole shoes 202. Permanent magnets 206 have opposite pole surfaces 208 and 210 of opposite magnetic polarity as indicated by letters N and S. Field windings 212 are disposed around ferromagnetic members 204. All of windings 212 have a winding direction which is the same for all of pole shoes 202.

When windings 211 are not energized, the lines of magnetic force produced by permanent magnets 206 are short circuited through ferromagnetic members 204 so that the brake or clutch is in an off condition. When field windings 212 are energized, the electromagnetic field produced thereby cooperates with the magnetic field produced by the permanent magnet 206 so that pole shoes 202 take on an alternating polarity as indicated by letters N and S.

The arrangement of FIG. 11 is intended to replace pole wheel 138 and windings 140 of FIG. 10. Pole shoes 202 then induce currents in windings 124. Windings 212 of FIG. 11 are connected through lines 150 and rectifier means 152 with exciting dynamo C. Adjustment of adjustable exciting dynamo C varies the current flowing to windings 212 for adjusting the strength of the field produced.

The arrangement described with respect to FIG. 11 has been found highly advantageous because it generates a higher flux density in the air gap with a lower current in the windings. Substantially less heat is generated than with pole wheel 138 and winding 140. Thus, the flux of the permanent magnets 206 adds to the flux of the windings 212. Windings 212 produce a higher strength magnetic field with the same heat producing current in the windings. The amount of current in windings 212 can be generally half as great with the same flux field.

Although the invention has been described with reference to specific embodiments, variations within the scope of the following claims will be apparent to those skilled in the art.

Having thus described my invention I claim:

1. An electrical induction device comprising: a fixed first member, a second member mounted on a rotatable shaft for rotation relative to said first member in close spaced relationship thereto, said first member including a plurality of poles and said second member including means for causing an alternating flux field in said poles when said members rotate relative to each other, said second member means including a plurality of circumferentially spaced, wafer-shaped, permanent magnets each having a pair of pole surfaces, ferromagnetic pole shoes having inner and outer ends disposed intermediate said pole surfaces, said magnets being magnetized in the direction of their thin dimension with adjacent pole surfaces having the same polarity so that the outer ends of said pole shoes define a second member circumference comprised of magnetic poles of alternating polarity, and said inner ends of said pole shoes including means for securing said pole shoes to said shaft and said outer ends of said pole shoes having short-circuit windings thereon.

2. An electrical induction brake or clutch comprising: a fixed first member, a second member mounted on a rotatable shaft for rotation relative to said first member in spaced-apart relationship thereto, said first member including a plurality of poles, said second member including permanent magnet means for causing an alternating flux field in said poles, the poles of said first member being arranged in at least two relatively movable pole rings in axially spaced relationship, and means for displacing said rings circumferentially relative to each other at least one pole pitch.

3. An electrical induction device comprising: a fixed first member, a second member mounted on a rotatable shaft for rotation relative to said first member in spaced-apart relationship thereto, said first member including a plurality of poles, said second member including means for causing an alternating flux field in said poles when said members rotate relative to each other, said second member including an exciting dynamo for producing an alternating exciting current, said exciting dynamo having an induction winding in electrical connection through at least one rectifier with said second member flux field causing means, said exciting dynamo including a rotor and a stator, said stator having at least two relatively circumferentially movable pole rings each including permanently magnetic material and a plurality of poles of the same pole pitch and means for displacing one of said pole rings relative to the other up to at least one pole pitch, whereby the exciting current may be adjusted.

4. The device defined in claim 3 wherein said exciting winding defines a rotor and said dynamo further includes means for electromagnetically exciting said stator.

5. An electrical induction device comprising: first and second members mounted for relative rotation in spaced-apart relationship; said first member including a plurality of poles having windings, said second member including a plurality of poles and permanent magnet means for causing alternating flux fields therein, the poles of one of said members being in at least two axially adjacent, relatively circumferentially adjustable rings, and means for adjusting said rings at least one pole pitch relative to each other.

6. An adjustable electrical induction device comprising: a first member defining an inductor body having a plurality of circumferentially-spaced permanent magnets thereon positioned to provide a plurality of circumferentially-spaced inductor body permanent magnet poles of alternating polarity, a second member defining an induction body having a plurality of circumferentially-spaced induction body poles, windings surrounding said induction body poles, one of said members being rotatable relative to the other of said members about an axis, said permanent magnet poles and said induction body poles being positioned in closely spaced relationship radially of said axis, said permanent magnet poles defining inducing means for inducing alternating current in said windings during rotation of said one member relative to said other member, said other member having said poles thereof circumferentially divided radially of said axis into at least two pole members spaced axially of said axis, adjustment means for angularly adjusting at least one of said pole members relative to the other of said pole members about said axis during rotation of said one member relative to said other member between a position wherein like poles on said pole members are aligned axially of said axis and a position wherein unlike poles on said pole members are aligned axially of said axis for varying the resultant value of said alternating current between maximum and zero values, said permenent magnet poles being defined by ferromagnetic pole shoes, said magnets having opposite faces and being positioned between said pole shoes, said magnets being magnetized across said opposite faces and being alternately reversely positioned so that like poles of said magnets face opposite sides of each said pole shoes, said pole shoes having outer ends, and short-circuit windings on said outer ends of said pole shoes.

7. An adjustable electrical induction device comprising: a first member defining an inductor body having a plurality of circumferentially spaced permanent magnets thereon positioned to provide a plurality of circumferentially spaced inductor body permanent magnet poles of alternating polarity, a second member defining an induction body having a plurality of circumferentially spaced induction body poles, windings surrounding said induction body poles, one of said members being rotatable relative to the other of said members about an axis, said permanent magnet poles and said induction body poles being positioned in closely spaced relationship radially of said axis, said permanent magnet poles defining inducing means for inducing alternating current in said windings during rotation of said one member relative to said other member, said other member having said poles thereof circumferentially divided radially of said axis into two pole members spaced axially of said axis, adjustment means for angularly adjusting at least one of said pole members relative to the other of said pole members about said axis during rotation of said one member relative to said other member between a position wherein like poles on said pole members are aligned axially of said axis and a position wherein unlike poles on said pole members are aligned axially of said axis for varying the resultant value of said alternating current between maximum and zero values, said inductor body and induction body cooperating to define an exciting dynamo for a variable magnetic torque coupling device including a rotor structure and a stator structure, one of said structures having an exciting winding connected through rectifier means to said windings on said induction body of said exciting dynamo, and excited windings on the other of said structures for cooperation with said exciting winding.

8. The device of claim 7 wherein said inductor body and said stator structure are attached together as a unit and said induction body and said rotor structure are attached together as a unit.

9. An induction brake or clutch comprising: a rotor structure and a stator structure, one of said structures having exciting windings and the other of said structures having excited windings, an exciting dynamo positioned within said one of said structures and having dynamo windings in which alternating electrical current is induced, said dynamo windings energizing said exciting windings through rectifier means.

10. The device of claim 9 wherein said one structure includes a plurality of circumferentially spaced pole shoes of alternating magnetic polarity, a plurality of permanent magnets having opposite pole surfaces, said permanent magnets being positioned with said pole surfaces disposed intermediate adjacent ones of said pole shoes, said exciting windings defining electro-magnetic means and being operatively associated with said permanent magnets for selectively regulating the magnetic field generated between adjacent ones of said pole shoes.

11. The device of claim 10 and further including a ferromagnetic member positioned between every other pair of said pole shoes, said permanent magnets being positioned between every remaining pair of said pole shoes with said opposite pole surfaces in contact with adjacent pole shoes whereby pole shoes of alternating polarity are produced.

12. The device of claim 11 wherein said exciting windings are on said ferromagnetic members and have a direction of winding which is the same for all of said pole shoes.

13. The device of claim 9 wherein said dynamo includes a dynamo rotor and a dynamo stator, said rotor structure and said dynamo structure being attached together as a unit, and said dynamo stator and said stator structure being attached together as a unit.

14. The device of claim 13 wherein said dynamo windings are on said dynamo rotor, said dynamo stator including a plurality of annular pole rings, each of said pole rings having a plurality of circumferentially spaced dynamo permanent magnets of alternating polarity, adjustment means for angularly adjusting at least one of said pole rings relative to the other of said pole rings between a position wherein opposite poles of said dynamo permanent magnets on adjacent ones of said pole rings are opposite one another and a position wherein like poles of said dynamo permanent magnets on adjacent ones of said pole rings are opposite one another for varying the value of alternating current induced in said dynamo rotor windings by said dynamo permanent magnets.

15. The device of claim 14 wherein said rotor structure includes a plurality of circumferentially spaced pole shoes of alternating magnetic polarity, a plurality of permanent magnets having opposite pole surfaces, said permanent magnets being positioned with said pole surfaces disposed intermediate adjacent ones of said pole shoes, said exciting windings defining electromagnetic means and being operatively associated with said permanent magnets for selectively regulating the magnetic field generated between adjacent ones of said pole shoes.

16. A rotating electrical induction device comprising:
 1. a stator having:
   a. a first set of plurality of poles with electrical windings thereon adapted to be connected to a load;
   b. a second set of a plurality of poles of alternating magnetic polarity;
 2. a rotor adapter to be driven and having:
   a. a first set of poles including electrical windings;
   b. a second set of poles with electrical windings thereon electrically connected to said rotor first set windings;
 3.
   a. all of said sets being arranged in an annulus each coaxial with the other;
   b. said stator and rotor first sets being in magnetically coupled relationship and said stator and rotor second sets being in magnetically coupled relationship, said rotor first set being comprised of a plurality of circumferentially spaced pole shoes, a magnet in the space between each shoe, each having a circumferentially extending axis of magnetization, alternate magnets being permanent with like magnetic polarity, the remaining magnets each including one of said windings on a ferromagnetic core and with like magnetic polarity to each other but opposite to said permanent magnets, said magnets and pole shoes forming a closed magnetic loop whereby when said windings are energized, said pole shoes have alternate magnetic polarity with a flux equal to the sum of the permanent and electromagnets and when unenergized, zero flux.

17. The device of claim 16 wherein said electrical connection between said rotor windings includes an AC to DC rectifier.

18. The device of claim 17 wherein said stator second set includes two axially spaced rings of a plurality of spaced pole shoes and permanent magnets between said shoes of each ring polarized for magnetically energizing same with alternating magnetic polarity, said rings being relatively circumferentially adjustable whereby to vary the voltage induced in said rotor second set windings.

* * * * *